July 27, 1943.  C. E. BANNISTER  2,325,465

METHOD OF MAKING HOSE

Original Filed Sept. 3, 1940   2 Sheets-Sheet 1

INVENTOR.
Clyde E. Bannister
BY
Willard D. Eakin
ATTORNEY

July 27, 1943. C. E. BANNISTER 2,325,465
METHOD OF MAKING HOSE
Original Filed Sept. 3, 1940 2 Sheets-Sheet 2

INVENTOR.
Clyde E. Bannister
BY
Willard D. Eakin
ATTORNEY

Patented July 27, 1943

2,325,465

UNITED STATES PATENT OFFICE 2,325,465

METHOD OF MAKING HOSE

Clyde E. Bannister, Houston, Tex.

Original application September 3, 1940, Serial No. 355,112. Divided and this application August 14, 1942, Serial No. 454,763

6 Claims. (Cl. 29—84)

This invention relates to methods of making multiple-passage fluid-conducting hose and especially hose adapted to sustain a heavy lengthwise strain, as in supporting in an earth-boring a fluid-actuated motor supplied with motive fluid by the hose and actuating a mechanism such as a drilling bit or a pump.

The present application is a division of my copending application Ser. No. 355,112, filed Sept. 3, 1940.

The chief objects of the present invention are to provide economically a line of hose consisting of a plurality of lengths or sections securely coupled together and adapted to support a heavy weight; to provide for the convenient coupling and uncoupling of lengths of hose each having a plurality of flow passages, or each having a special tension element incorporated in it. A more specific object is to provide an improved method for assembling in desired relationship a plurality of passage-defining members or a passage-defining member and a tension element, with suitable end-fittings.

Figures 1, 2:
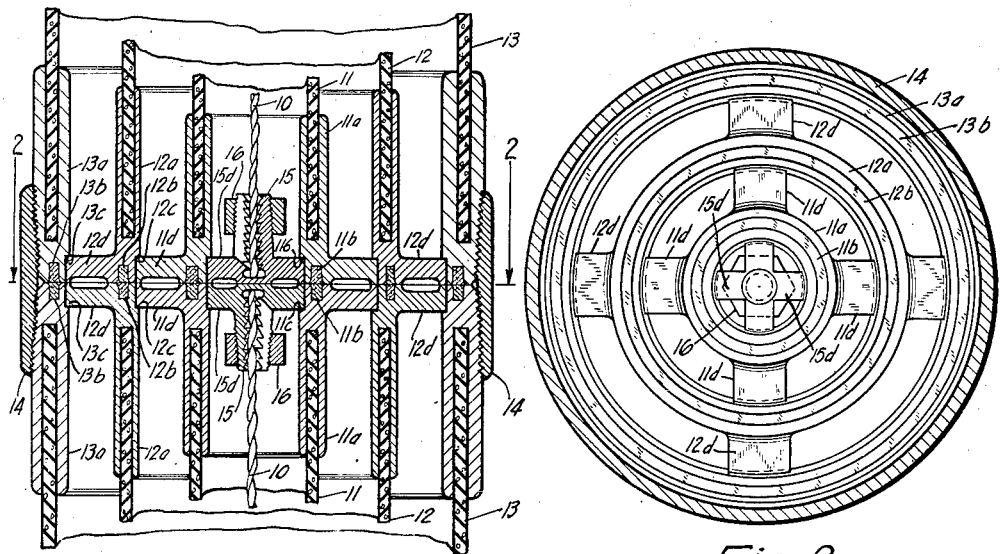
Fig. 1 is a middle, longitudinal section of a multiple-passage hose assembled in accordance with my invention in its preferred form, cable-lengths constituting parts of the structure being shown in elevation.
Fig. 2 is a section on line 2—2 of Fig. 1.

Referring to the drawings, and at first to Figs. 1 and 2, the particular hose chosen to be shown here for purpose of illustration and not of limitation has three fluid passages which in each length of hose is defined by a central supporting cable 10, an inner hose tube 11 spaced from and surrounding the cable, an intermediate hose tube 12 spaced from and surrounding the inner hose tube 11, and an outer hose tube 13 spaced from and surrounding the intermediate hose tube 12.

These hose tubes preferably are of graduated wall thickness as shown, the outer tube being of the greatest wall thickness, for strength, because it is subjected to high strain not only because of its relatively large diameter but also because the pressure of fluid next within it may be to only a relatively small extent offset by atmospheric pressure or, near the top of the wall, only a small head of water or drilling fluid, whereas the pressure on opposite faces of the walls of the other tubes are more nearly equalized and also those tubes are subjected to lighter strain, other things being equal, by reason of their relatively small diameters.

Swedged upon each end of each length 13 of the outer hose tube is a coupling ring or double-walled sleeve 13ª provided with a gasket 13ᵇ and formed with an internal annular shoulder 13ᶜ and with external threads for engagement by an annular coupling 14.

Similarly each end of each length of the intermediate hose tube 12 has swedged thereon a coupling ring or double-walled sleeve 12ª provided with a gasket 12ᵇ and formed with an internal annular shoulder 12ᶜ and also with radiating spider arms 12ᵈ adapted to seat at their outer ends upon the annular shoulder 13ᶜ of the outer tube's coupling ring 13ª.

Likewise each end of each length of the inner hose tube 11 has swedged thereon a coupling ring or double-walled sleeve 11ª provided with a gasket 11ᵇ and formed with an internal annular shoulder 11ᶜ and with radiating spider arms 11ᵈ adapted to seat against the annular shoulder 12ᶜ of the intermediate tube's coupling ring 12ª.

Each end of each length of cable 10 has secured thereon a taper-jaw end-fitting 15, the toothed jaws of which are sprung against the cable by a taper-threaded nut 16 and each of the end-fittings 15 is formed with radiating spider arms 15ᵈ adapted to seat against the annular shoulder 11ᶜ of the coupling ring 11ª of the inner hose tube 11.

In the assembling of these parts the coupling rings 13ª are mounted on the two ends of the hose length 13 and a coupling ring 12ª is mounted on one end of the hose length 12 and the other end of the hose length 12 is passed into and through the hose length 13 until the spider arms 12ᵈ engage the shoulder 13ᶜ at the first mentioned end. The hose length 12 is then stretched or the hose length 13 is compressed lengthwise, or both, to cause the unequipped end of the length 12 to protrude from the length 13 and while it so protrudes the second coupling ring 12ª is mounted upon it. Upon release of the two hose lengths the spider arms 12ᵈ of the last applied coupling ring 12ª seat snugly against the adjacent shoulder 13ᶜ, by reason of the recoil of the hose lengths.

The inner hose length 11 and the cable length 10 are incorporated in the assembly in the same way, in succession, except that the cable 10 is not adapted to stretch very substantially, which makes it necessary to obtain protrusion of its last-equipped end chiefly by lengthwise compression of the assembled hose lengths.

A series of the composite lengths of hose are then coupled by means of threaded couplings such as the coupling 14 and the resulting line of hose is manipulated as desired.

Figure 3:
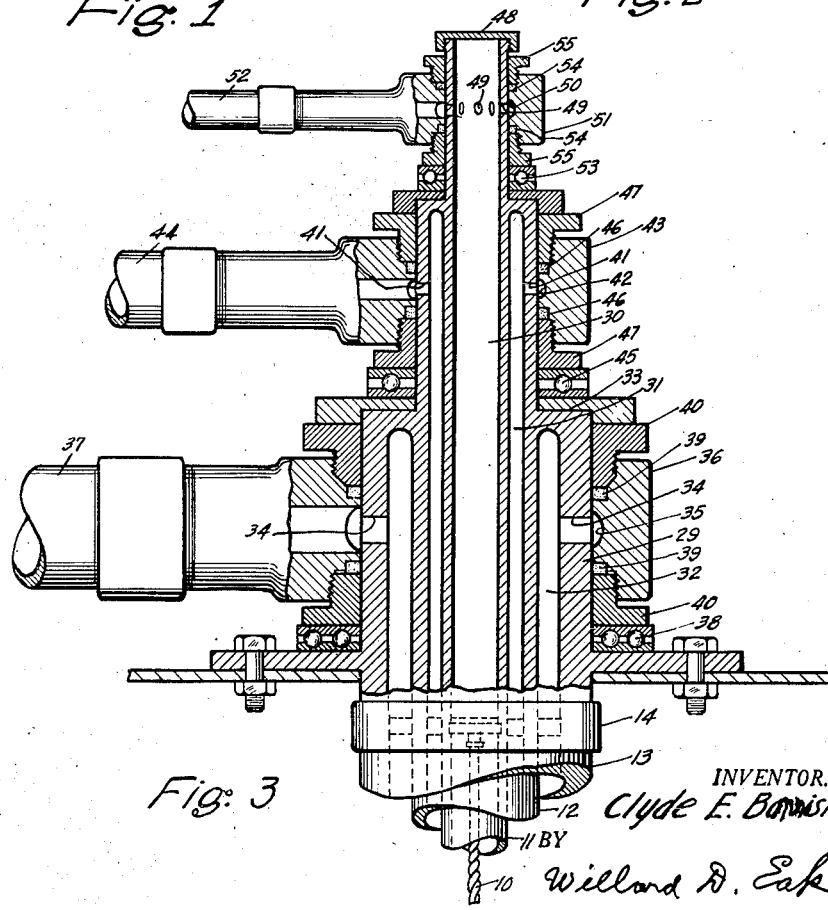
Fig. 3 is a break-away middle section of a multiple-passage end fitting for the hose and swivel connections for supplying fluid to or receiving fluid from the several passages of the hose.
Figure 4:
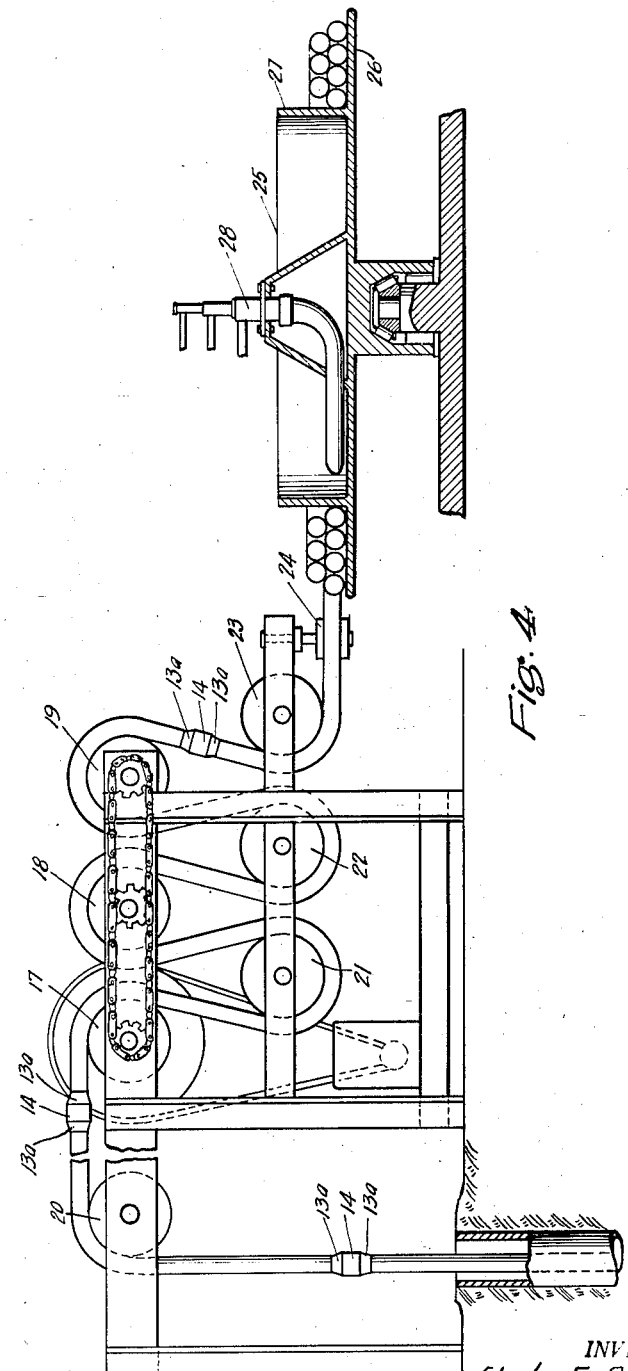
Fig. 4 is an elevation of a pull-out and reeling assembly in association with the hose.

Figs. 3 and 4 show convenient end fittings and apparatus for use of the hose for well-drilling or well-pumping purposes, for example.

In Fig. 4 is shown a series of driven pull-out and hold-back rolls 17, 18, 19 and guide rolls 20 to 24 cooperating with a hose reel 25, here shown as a vertical-axis reel and comprising a turn-table having a horizontal, annular hose-supporting portion 26 and a vertical flange or spool portion 27 against which the hose is wound.

For supplying fluid to or receiving fluid from the several passages of the hose while permitting it to be reeled onto or off of the turn-table a swivel type end-fitting 28 is provided.

It is shown in detail in Fig. 3. Preferably it comprises a unitary casting 29 formed with passages 30, 31 and 32 communicating with the respective passages of the hose, the casting being coupled to the upper end of the adjacent hose section, inclusive of the cable section 10, in the same manner as the upper hose section in Fig. 1 is coupled to the lower hose section in that figure.

The outermost passage 32 of the casting extends upward only part way of the casting, in a large-diameter part of the latter which terminates at a shoulder 33, and the outer wall of this passage is formed with apertures 34, 34 through which the passage is in communication with an annular internal groove 35 formed in a distributor ring 36 which surrounds the casting and is in communication with a stationary conduit 37.

The distributor ring 36 is provided with a supporting bearing 38, packing rings 39, 39 and packing nuts 40, 40.

Similarly the intermediate passage 31 extends only part way to the top of the casting, in a portion thereof of intermediate diameter, and through ports 41, 41 and an internal annular groove 42 in a distributor ring 43 it is in communication with a stationary conduit 44. The distributor ring 43 is provided with a supporting bearing 45, packing rings 46, 46 and packing nuts 47, 47.

The innermost passage 30 extends to the top of the casting, where it is closed by a screw-cap 48, and through ports 49, 49 and an internal annular groove 50 in a distributor ring 51 it is in communication with a stationary conduit 52. The distributor ring 51 is provided with a supporting bearing 53, packing rings 54, 54 and packing nuts 55, 55.

The construction and procedure as described provides the several advantages set out in the above statement of objects and various modifications are possible within the scope of the appended claims.

I claim:

1. The method of making a fluid-conducting hose assembly unit which comprises placing a longitudinally disposed inner member within a flexible and resilient tube of substantially the same length and anchoring an end of one to the adjacent end of the other, temporarily changing the length of at least one of the recited elements by the application of mechanical force to cause the said inner member to protrude from the tube at their other ends, applying an end anchorage member to the protruding portion of the inner member while it so protrudes, the adjacent end of the tube being provided with a fluid-conducting end anchorage member, and then permitting said anchorage members to be seated against each other by simple, sliding, non-rotary movement incident to recoil of the two first-recited elements.

2. The method of making a fluid-conducting hose assembly unit which comprises placing a longitudinally disposed inner member within a flexible and resilient tube of substantially the same length and anchoring an end of one to the adjacent end of the other, temporarily changing the length of at least one of the recited elements by the application of mechanical force to cause the said inner member to protrude from the tube at their other ends, applying an end anchorage member to the protruding portion of the inner member while it so protrudes, the adjacent end of the tube being provided with a fluid-conducting end anchorage member, then permitting said anchorage members to be seated against each other by simple, sliding, non-rotary movement incident to recoil of the two first-recited elements, likewise providing a second unit, and then coupling the two units to each other in fluid-conducting relation.

3. The method of making a fluid-conducting hose assembly unit which comprises placing one flexible and resilient tube within another of substantially the same length and thus defining an annular fluid passage between them, anchoring an end of one to the adjacent end of the other, temporarily changing the length of at least one of the tubes by the application of mechanical force to cause the inner tube to protrude from the outer tube at their other ends, mounting a fluid-conducting end-fitting on the protruding portion of the inner tube while it so protrudes, the adjacent end of the outer tube being provided with a fluid-conducting end-fitting, and then permitting the said end-fittings to be seated against each other by simple, sliding, non-rotary movement incident to recoil of the tubes.

4. The method of making a fluid-conducting hose assembly unit which comprises placing one flexible and resilient tube within another of substantially the same length and thus defining an annular fluid passage between them, anchoring an end of one to the adjacent end of the other, temporarily changing the length of at least one of the tubes by the application of mechanical force to cause the inner tube to protrude from the outer tube at their other ends, mounting a fluid-conducting end-fitting on the protruding portion of the inner tube while it so protrudes, the adjacent end of the outer tube being provided with a fluid-conducting end-fitting, then permitting the said end-fittings to be seated against each other by simple, sliding, non-rotary movement incident to recoil of the tubes, likewise preparing a second unit, and then coupling the units to each other in fluid-conducting relation.

5. The method of making a fluid-conducting hose assembly unit which comprises placing a tension element within the bore of a flexible and resilient tube of substantially the same length, anchoring an end of one to the adjacent end of the other, temporarily shortening the tube by application of mechanical force to cause the tension element to protrude therefrom at the other end of the assembly, applying an end anchorage member to the protruding portion of the tension element while it so protrudes, the adjacent end of the tube being provided with a fluid-conducting end anchorage member, and then permitting the said anchorage members to be seated against each other by simple, sliding, non-rotary movement incident to the recoil of the two first-recited elements.

6. The method of making a fluid-conducting hose assembly unit which comprises placing a tension element within the bore of a flexible and resilient tube of substantially the same length, anchoring an end of one to the adjacent end of the other, temporarily shortening the tube by application of mechanical force to cause the tension element to protrude therefrom at the other end of the assembly, applying an end anchorage member to the protruding portion of the tension element while it so protrudes, the adjacent end of the tube being provided with a fluid-conducting end anchorage member, then permitting the said anchorage members to be seated against each other by simple, sliding, non-rotary movement incident to the recoil of the two first-recited elements, likewise providing a second unit, and then coupling the two units to each other in fluid-conducting relation.

CLYDE E. BANNISTER.